United States Patent [19]
Oh

[11] Patent Number: 5,931,398
[45] Date of Patent: Aug. 3, 1999

[54] LONG STROKE SPINNING REELS

[75] Inventor: Cheol Suk Oh, Seoul, Rep. of Korea

[73] Assignee: Shin A Sports Co., Ltd., Incheon, Rep. of Korea

[21] Appl. No.: 08/947,130

[22] Filed: Oct. 8, 1997

[30] Foreign Application Priority Data

Oct. 8, 1996 [JP] Japan ................................. 96-44461

[51] Int. Cl.⁶ .................................................. A01K 89/01
[52] U.S. Cl. ........................................ 242/241; 242/242
[58] Field of Search ..................................... 242/241, 242

[56] References Cited

U.S. PATENT DOCUMENTS

| | | |
|---|---|---|
| 2,854,200 | 9/1958 | Montgomery . |
| 3,908,927 | 9/1975 | Louison . |
| 4,416,428 | 11/1983 | Noda . |
| 4,618,107 | 10/1986 | Nakajima . |
| 4,892,267 | 1/1990 | Webb . |

FOREIGN PATENT DOCUMENTS

| | | | |
|---|---|---|---|
| 1006058 | 4/1952 | France | 242/241 |
| 1299923 | 6/1962 | France | 242/241 |

*Primary Examiner*—Donald P. Walsh
*Assistant Examiner*—William A. Rivera

*Attorney, Agent, or Firm*—Peter F. Corless; Dike, Bronstein, Roberts & Cushman LLP

[57] ABSTRACT

A long stroke spinning reel including a tubular traverse cam shaft to reciprocate a spool. The spinning reel comprises a reel body having a front opening; a drive gear rotatably supported inside of the reel body and operable to rotate by rotating of a handle; a tubular pinion shaft having a pinion on a periphery of the shaft to rotate the shaft by rotation of the handle, and a pinion sleeve which is extended forwardly from the pinion through the front opening, is rotatably supported on the front opening and is formed with a threaded portion on a periphery of the front end; a rotor fitted from a front of the front opening into the pinion sleeve; a main shaft disposed in the tubular pinion shaft, a front end of the main shaft being disposed inside the spool and the rear end of the main shaft being reciprocatably secured to the reel body; a tubular traverse cam shaft having on its periphery a traverse groove, the tubular traverse cam shaft being rotatably and reciprocatably disposed around the main shaft and having a threaded portion which is threaded with the threaded portion of the pinion sleeve to integrally engage the tubular pinion shaft with the rotor; a pawl meshing with the traverse groove and moving back and forth by rotation of the traverse cam shaft; and pawl securing means for fixing the pawl to the main shaft to prevent the pawl from radially rotating with the traverse cam shaft.

6 Claims, 9 Drawing Sheets

LONG STROKE SPINNING REELS

BACKGROUND OF THE INVENTION

1. Field of the Invention

The present invention relates generally to a spinning reel for fishing, and more particularly to a long stroke spinning reel in which a tubular traverse cam shaft is coaxially inserted into the shaft of a spool to move the spool reciprocatably.

2. Description of the Prior Art

The spinning reel for fishing generally includes a spool for winding a fishing line and a rotor rotatable relative to the spool for winding the fishing line onto the spool.

When the fishing line is paid out from the spool, the spool remains still or is rotated relative to the rotor. In particular, during the cast, because the fishing line is smoothly paid out from the spool without entangling and suffering from the casting resistance, the casting distance of the fishing line can be increased. In order to achieve this, the conventional spinning reel includes a bail arm for guiding the fishing line to be evenly distributed across the spool, and a mechanism for reciprocating the spool in a longitudinal direction, when the spool is rotated. A traverse cam mechanism is known as the most preferable reciprocating mechanism.

A typical conventional spinning reel incorporating such a traverse cam mechanism is shown in FIGS. 1A and 1B.

Referring to FIG. 1A, a pinion 6 is rotated by the drive gear (not shown) engaged with a handle. The pinion 6 forms a tubular pinion shaft in cooperation with a shank portion 6a protruding forwardly through the front opening of a reel body 10, in which a rotor 1 is fixed to the shank portion 6a rotatable with the pinion shaft (see FIGS. 2A to 2C).

The traverse cam shaft 20 is rotatably supported to the reel body 10 in parallel with the pinion shaft and is rotated with the pinion 6 via a helical gear 22.

In the back of the traverse cam shaft 20, an X-shaped worm gear 21 is disposed, and the cam portion 3c of a pawl 3b meshes with the worm gear 21, so that the pawl 3b is reciprocated in parallel with the traverse cam shaft 20 by rotation of the cam shaft 20.

A spool shaft 4, to which a spool (not shown) is inserted from the front and is reciprocatably secured, penetrates longitudinally through the pinion shaft and is reciprocatably supported on the pinion shaft. The spool shaft 4 engages the pawl 3b through a slider 3 to reciprocate with the pawl 3b which is reciprocated along traverse grooves by rotation of the worm gear 21, as can be seen in FIG. 1B.

With the construction described above, when the fishing line is retrieved, the line is guided by the bail arm secured to the rotor 1 and is wound onto the spool 8 which is reciprocated by the rotating rotor to evenly wind the line onto a winding portion 8d.

In case of the separate worm shaft 20 described above, however, the slider 3 must be integral with a worm slide portion 3e for guiding the reciprocation of the slider 3. Also, it is necessary to have the securing means such as a screw 3a for securing the slider 3 to the spool shaft 4 or to mount snap rings, which is not shown, on the spool shaft between the front and back of the slider 3 in order to rotate the spool shaft 4 relative to the slider 3. Also, after the pawl 3b is inserted into a pawl inserting hole 3d, a pawl cap 3f which supports the rear end of the pawl 3b is fixed to the slider 3 so that the pawl cam portion 3c meshes with the worm gear 21. Accordingly, besides transmission parts comprising the helical gear 22 or the spur gears 23 and 24, the number of other components increases, thereby complicating assemblage thereof.

Also, because the transmission mechanism has numerous components, precision degree is required so that the worm gear 21 meshes smoothly with the pawl 3b. And, there are additional problems such as the worm gear 21 made of a brass material is plated with chrome in order to easy the machining work and to enhance the wear resistance.

Besides, in the separate traverse cam mechanism, because the slider 3 can not be reciprocated by rotation of the spool, the fishing line is paid out at several angles from the winding portion of the spool 8, with the spool 8 remaining still, during the cast. When the fishing line is wound at a large angle, the fishing line is continuously snarled in one direction on the line guiding roller 9a of the bail arm and then is easily entangled, as well as the fishing line, when being paid out, suffers from the casting resistance.

In order to solve the above problems, several methods have been proposed, in that U.S. Pat. Nos. 4,416,428 (Nov. 22, 1983) and 4,618,107 (Oct. 21, 1986), and Korean Utility Model No. 89-8646 (Nov. 30, 1989) disclose a worm shaft formed with a worm gear, and the spinning reel of front drag type disclosed in Korean Utility Model No. 89-8646 is shown in FIGS. 2A to 2D.

Referring to FIGS. 2A to 2D, it will be understood that the rotor portion of the spool shaft 4 is formed with a worm gear 4a which meshes with a pawl 5a, and the pawl 5a is secured to a rotor 1 through a guide 5.

By the rotation of a handle 11, a drive gear 2 mounted on a reel body 10 and a pinion 6 which meshes with the drive gear 2 are rotated, and the rotating force of the pinion 6 is transferred to the rotor 1 secured to the shank portion 6a of a pinion shaft. At that time, the fishing line is guided by a bail arm 9 and a line guiding roller 9a which are secured to the rotor 1 and is wound onto the winding portion 8a of the spool 8.

Also, the worm gear 4a meshed with the cam portion of the pawl 5a functions as a traverse cam by rotation of the rotor 1 and the pawl 5a, such that a slider 3 and the spool shaft 4 are guided by a guiding rail 7 and reciprocate. Accordingly, when being retrieved, the fishing line is evenly wound onto the winding portion 8a of the spool 8. Therefore, in case of the spool shaft 4 being formed integrally with the worm gear 4a, it significantly reduces the number of components in contrast to the separate construction shown in FIG. 1A.

In such a spinning reel of front drag type, however, when the fishing line is paid out from the spool, because the spool 8 remains still, the problems of the line being snarled and suffering from the casting and retrieving resistance have not yet been solved. Also, the length of the worm gear 4a can be extended, without altering the whole dimension of the reel by forming the worm gear 4a on the spool shaft 4. As shown in FIGS. 2A to 2D, however, the guide 5 is secured to the spool side of the rotor 1, i.e., the front of the rotor, and a key 4b and a key groove 8b for transferring the rotation force to the intermediate between the spool shaft 4 and the spool 8 are formed on the rotor 1 of the spool 8, i.e., the back of the rotor, so that when the spool 8 moves forwardly the large portion of the worm 4a is protruded in the forward of the shank portion 6a of the pinion shaft 6a. Accordingly, the spool shaft 4 may be easily destroyed at the weak pawl portion 5a of the worm gear 4a by the torsion load due to rotation of the spool shaft and the respective bending load which acts in the direction of an arrow Y on the spool shaft 4 by the fishing line. Meanwhile, because the bending or torsion deformation is caused on the spool shaft 4, the above traverse cam may not operate properly.

Accordingly, the length of the worm gear 4a must be shortened and also the diameter of the spool shaft 4 must be enlarged. With the arrangement described above, one problem occurs that the whole dimension of the reel body 10 will be enlarged by the enlargement of the diameters of the tubular pinion shaft and the pinion 6. Also, in order to maintain the constant transmission ratio of the drive gear 3 and the pinion 6, the size of the drive gear 3 must be further enlarged, which is another problem.

Also, because the length of the worm 4a has to be shortened, the stroke of the spool 8 is shortened, thereby reducing the length of the winding portion 8d of the spool. In order to wind the equal quantity of the fishing line, the outer diameter of the spool 8 has to be enlarged, and the spool having the large outer diameter increases the casting resistance.

Even if the impact load is applied in the direction of an arrow X shown in FIG. 2C, the impact load is transferred directly to the worm gear 4a or the cam portion of the pawl 5a, resulting in its deformation. The deformation will cause the cam to operate improperly or not operate at all. This drawback is severe than the spinning reel shown in FIG. 1A.

With the above reasons, the spinning reel shown in FIGS. 2A to 2D has not been commercialized as much as the spinning reel shown in FIGS. 1A and 1B in which the worm shaft is separated.

In order to solve the above problems, the inventor filed a Korean patent application for the invention entitled "LONG STROKE SPINNING REEL" on Jun. 23, 1995, Application No. 95-16986, in which the spool rotates and reciprocates during the cast and the spool shaft is formed integral with the traverse grooves.

As can be seen in FIGS. 3A and 3B, the above long stroke spinning reel is rotatably supported with the tube-shaped pinion shaft which is journaled on a bearing 37 and consists of a pinion 36 and a shank portion 36a. When a spool 38 moves backwardly, the pinion shaft is inserted into the shank guiding portion 38b of the spool 38. With the shank portion 36a of the pinion shaft protruding in the forward of the rotor 31, as shown by arrows B and C.

A spool shaft 34 is slidably inserted to the inside of the pinion shaft and is formed at its front with a D-shaped key 34b and a lock-pin groove 34C. By a locking pin 8c which is inserted from the front of the spool shaft 34 and abuts against the shoulder 34d of the locking pin to prevent from departing, the spool 38 is detachably inserted into the front of the spool shaft 34. In order to provide the spool 38 with means for damping the forward impact load, the front of the spool shaft inserting opening is formed with an enlarged spring receiving hole 38e, and a washer 42 and a spool holder 38c which are connected by the key 34b are inserted into the spring receiving hole 38e, with a compressing spring 41 interposed between the washer and the spool holder.

The spool holder 38c is fixed to the spring receiving hole 38e of the spool by a 43, with the washer 42 abutting against the shoulder of the back end of the spring receiving hole 38e and the spring 41 compressing properly. Also, when the spool 38 is mounted, in order to closely contact the locking pin 8c with the lock-pin shoulder 34d, in which the pin 8c is supported on the front of the spool 38, the spring 41 is slightly compressed by the washer 42 and the back shoulder of the key 34b, and the lock-pin groove 34 is extended backwardly longer than the diameter of the locking pin 8c.

Also, the spool shaft 34 and the tubular portion of the pinion shaft 36a consist of a double stage to enlarge only the diameter of the worm gear 34a for increasing its strength.

In addition, the pawl 35 penetrates the pawl inserting hole 36c formed on the shank portion of the pinion shaft and meshes with the worm gear 34a at the cam portion of the front end. The back end of the pawl 35 is backwardly extended from the pawl inserting hole 36c formed on the shank portion 36a of the pinion shaft, as shown by an arrow D, and is supported on the extended inner wall through the pawl holder 35a, as shown by an arrow A.

With the long stroke spinning reel consisting of the construction described above, when the fishing line is released, the fishing line can be paid out without snarling or entangling or without suffering from the casting resistance, because the spool rotates and reciprocates. And, the reel has other advantages of the longer casting distance, higher strength and impact resistance, and smaller assembling processes.

However, because the spool shaft is formed with the traverse groove and its strength is deteriorated, even if the spool shaft has a damping device, the spool shaft can be deformed or destroyed by the exterior impact load. This causes the traverse cam to operate improperly. In addition, because the diameter of the traverse groove is restricted by the construction of the pinion consisting of double-stage shaft, the handle has to be rotated at a faster spinning rate against the same reducing ratio to wind the long length of fishing line.

SUMMARY OF THE INVENTION

Therefore, in order to solve the above problems, one object of the present invention is to provide a spinning reel having a tubular traverse cam shaft, by which the strength of the traverse cam shaft and a pawl is increased and the traverse cam operates properly against the impact load.

Another object of the present invention is to provide a spinning reel capable of winding the long length of a fishing line by the smaller spinning number of a handle relative to a same speed reducing ratio.

Another object of the present invention is to provide a spinning reel capable of increasing the casting distance.

In order to achieve the above objects, the spinning reel for fishing according to the present invention comprises a reel body having a front opening; a drive gear rotatably supported inside of the reel body and operable to rotate by rotating of a handle; a tubular pinion shaft having a pinion on a periphery of the shaft to rotate the shaft by rotation of the handle, and a pinion sleeve which is extended forwardly from the pinion through the front opening, is rotatably supported on the front opening and is formed with a threaded portion on a periphery of the front end; a rotor fitted from a front of the front opening into the pinion sleeve; a main shaft disposed in the tubular pinion shaft, a front end of the main shaft being disposed inside the spool and the rear end of the main shaft being reciprocatably secured to the reel body; a tubular traverse cam shaft having on its periphery a traverse groove, the tubular traverse cam shaft being rotatably and reciprocatably disposed around the main shaft and having a threaded portion which is threaded with the threaded portion of the pinion sleeve to integrally engage the tubular pinion shaft with the rotor; a pawl meshing with the traverse groove and moving back and forth by rotation of the traverse cam shaft; and pawl securing means for fixing the pawl to the main shaft to prevent the pawl from radially rotating with the traverse cam shaft.

With the construction described above, the strength of the tubular traverse cam shaft and pawl can be increased, and the long length of the fishing line can be wound by the smaller spinning rate of the handle relative to the same speed reducing ratio.

Also, the pawl securing means includes a pawl holder supporting and preventing the pawl against the radial movement of the traverse cam shaft and fitted into the periphery of the pinion shaft, a pawl cap having on its front end a plurality of key grooves for supporting the pawl against its radial and outward movement to the tubular cam shaft, and a metal sleeve secured to the pawl cap and secured to the main shaft reciprocatable with the main shaft. The spool includes a plurality of keys engaged with the plurality of key grooves to detach the spool from a rear end of the spool and rotate with the spool, and is fitted into the metal sleeve.

Also, pawl cap is inserted into a periphery of the pawl holder to rotate with the pawl holder and move backwardly from the pawl holder. The metal sleeve is inserted rotatably and reciprocatably into a periphery of the traverse cam shaft, with a desired gap between the metal sleeve and the pawl holder, and has a flange formed on a periphery of its back side. A spring is interposed between the pawl holder and metal sleeve. When impact load is applied to the main shaft, the spring absorbs the impact load through the metal sleeve, and when the pawl moves forwardly, the spool moves through the pawl holder, the spring and the metal sleeve.

Besides, the pawl cap includes a through hole and a screw fitted into the through hole and secured to the pawl holder to rotate with the pawl holder and to move backwardly from the pawl holder.

Also, the pawl cap is securely inserted to the periphery of the pawl holder. A coupling of the spool and a coupling of the pawl cap is rotatably engaged with each other, with a desired gap between them, to move the spool backwardly, when impact load is applied to the spool from the front. The metal sleeve is disposed rotatably and reciprocatably to the periphery of the traverse cam shaft, with a desired gap between the metal sleeve and pawl holder, and has a flange formed on the periphery of its back. The pawl cap has a flange formed on its inner side of a front end of the pawl cap to contact rotatably with the flange of the metal sleeve, thereby causing the metal sleeve, the main shaft and the spool to move backwardly, when the pawl moves backwardly. A spring is interposed between the pawl holder and the metal sleeve. When impact load is applied to the main shaft from a forward, the spring absorbs the impact load through the metal sleeve, and when the pawl moves forwardly, the spool moves through the pawl holder, the spring and the metal sleeve.

BRIEF DESCRIPTION OF THE DRAWINGS

The above objects, other aspects, and advantages of the invention will become apparent by describing the preferred embodiments thereof with reference to the accompanying drawings, in which.

DETAILED DESCRIPTION OF THE PREFERRED EMBODIMENTS

Figure 1A:
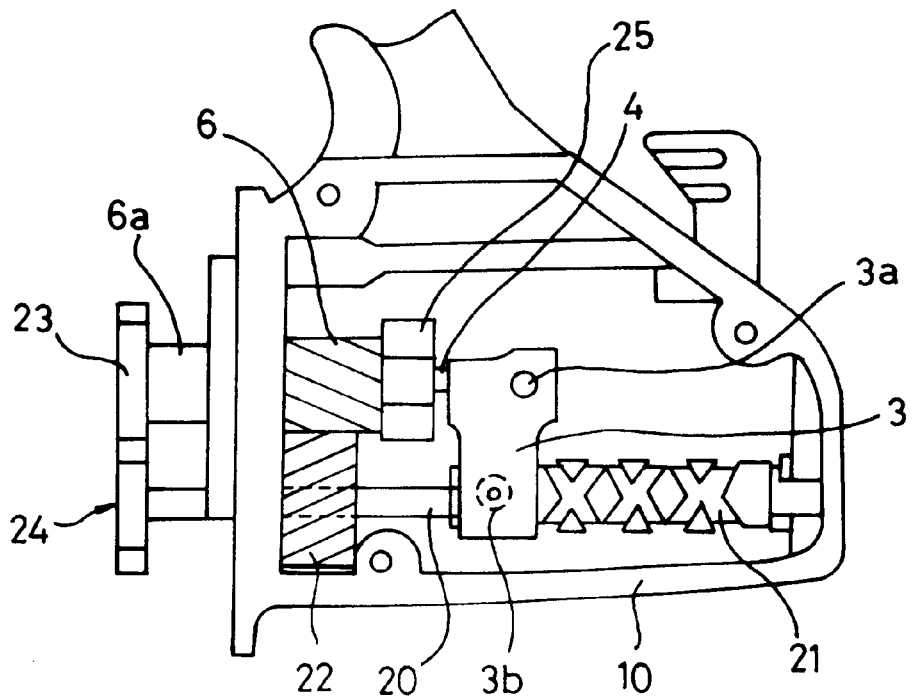
FIG. 1A is a side sectional view showing perspectively the spool reciprocating mechanism of a conventional spinning reel, in which the spool reciprocating mechanism includes a separate type of a traverse cam shaft.
Figure 1B:
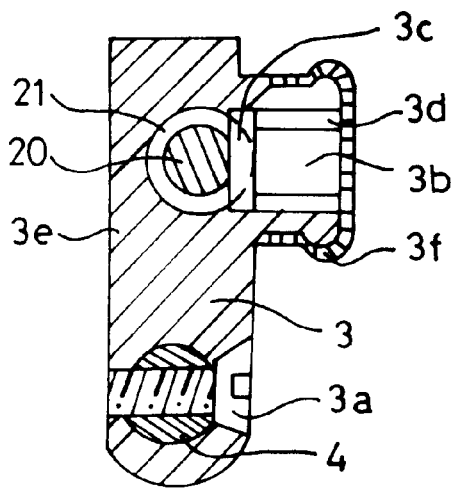
FIG. 1B is a sectional view of the driving portion of a traverse cam shaft.
Figure 2A:
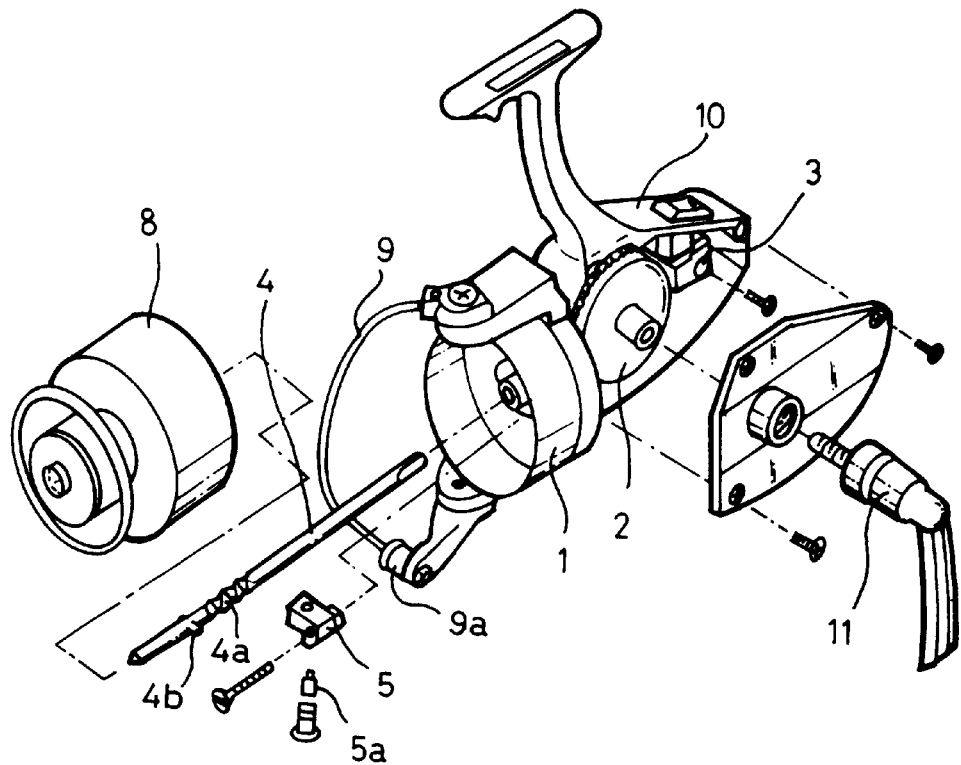
FIG. 2A is an exploded view illustrating a front drag type of a conventional spinning reel, in which a main shaft is formed on its outer periphery with a traverse groove.
Figure 2B:
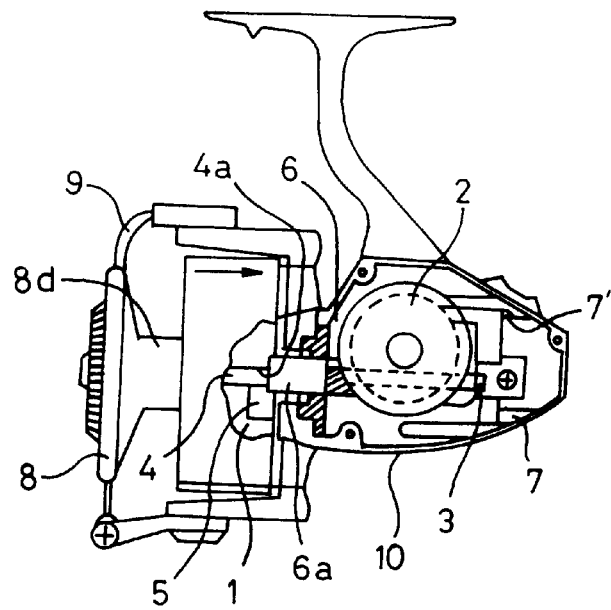
FIGS. 2B and 2C are views respectively illustrating the forward and backward movements of the main shaft shown in FIG. 2A.
Figure 2C:
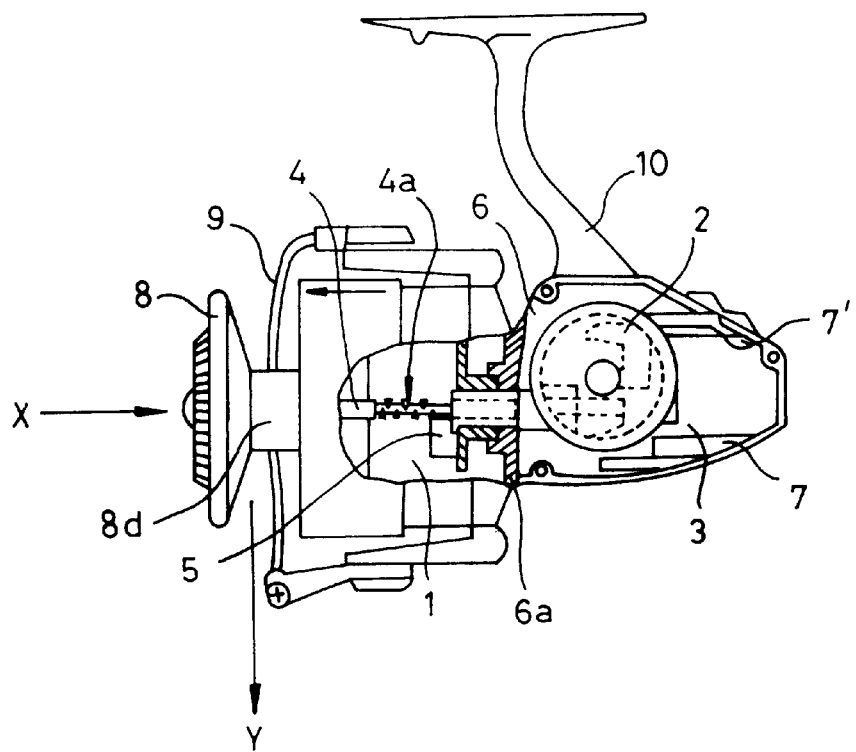
Figure 2D:
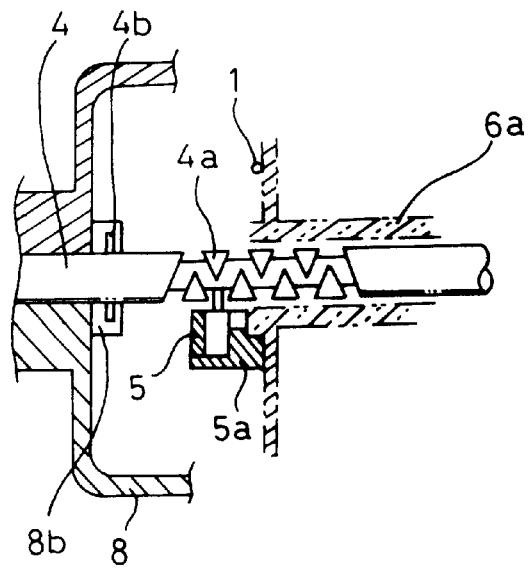
FIG. 2D is an enlarged sectional view of the traverse groove portion.
Figure 3A:
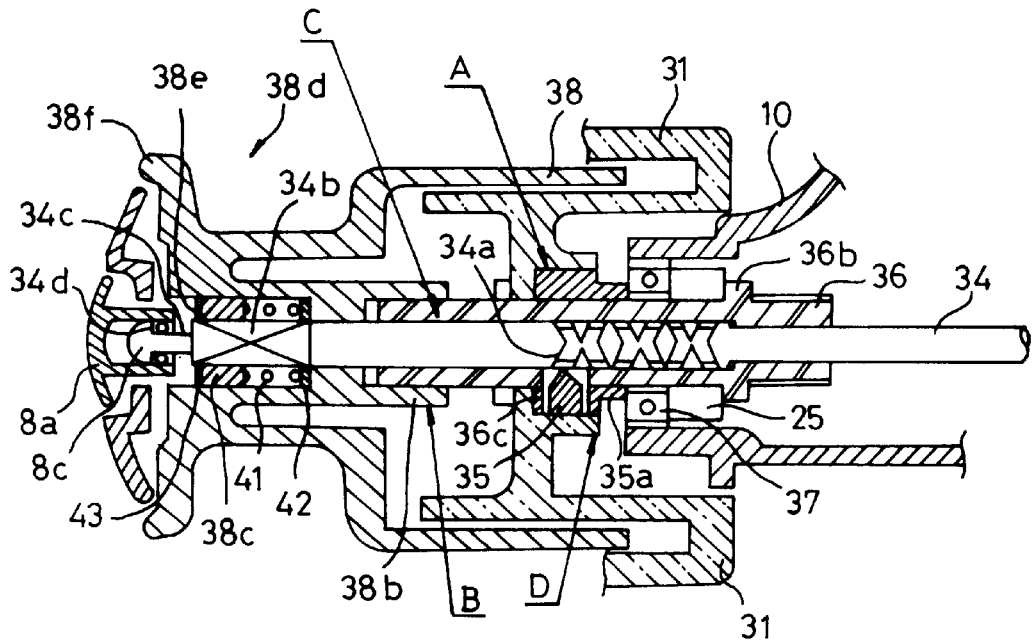
FIG. 3A is a longitudinal sectional view showing the backward movement of a conventional long stroke spinning reel.
Figure 3B:
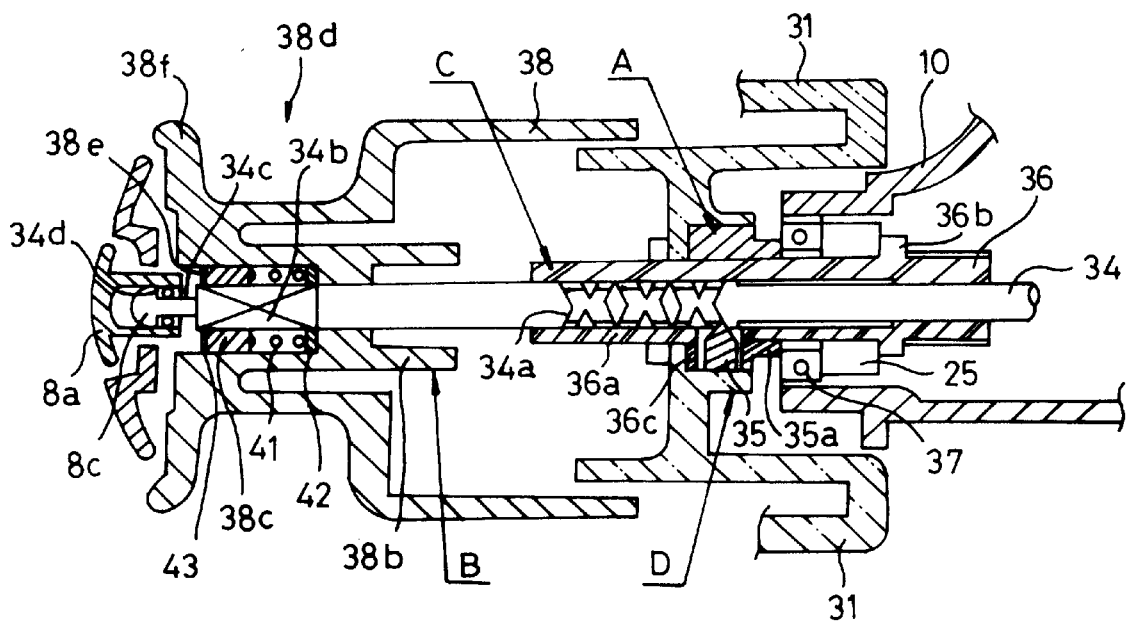
FIG. 3B is a longitudinal sectional view showing the forward movement of FIG. 3A.
Figure 4:
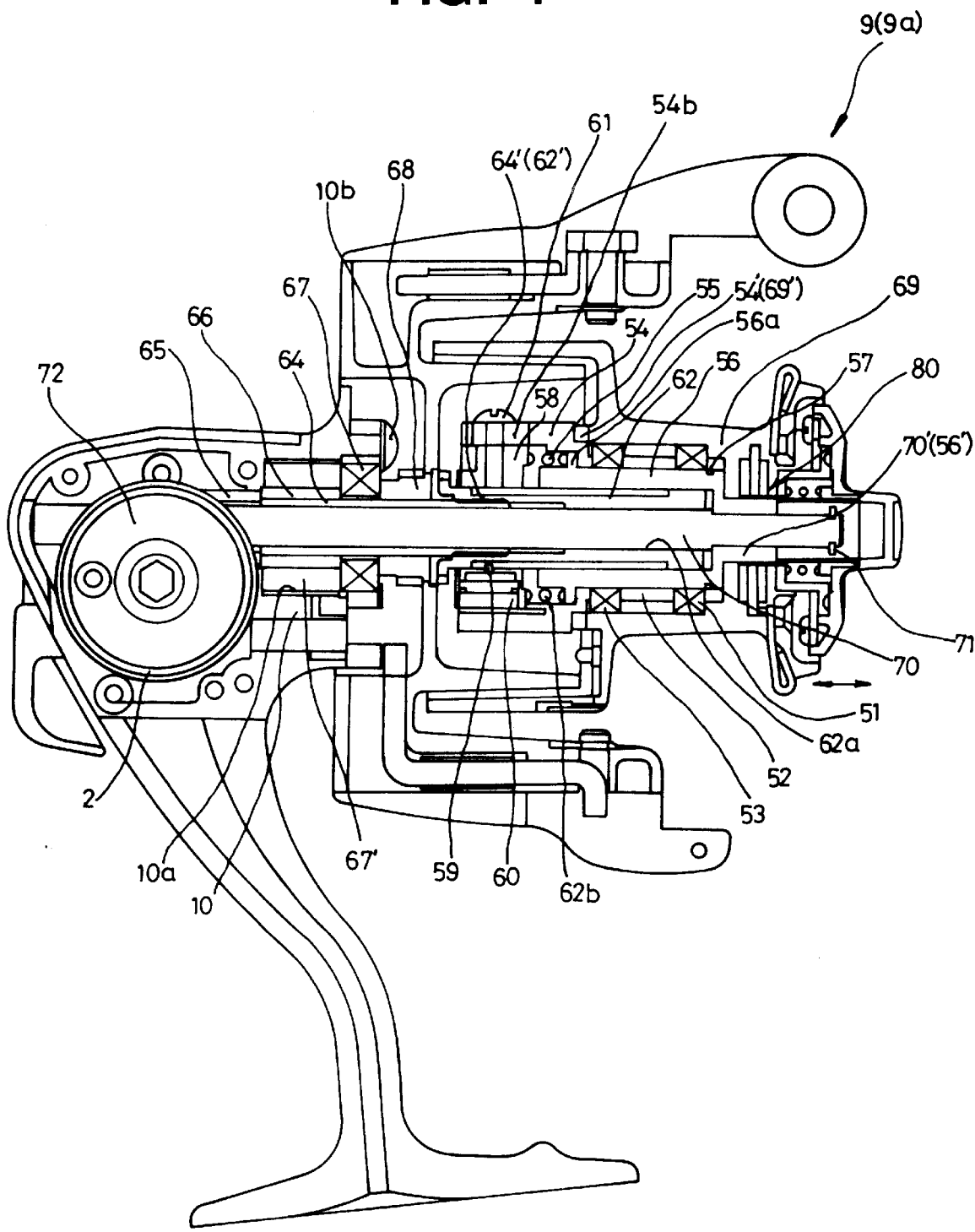
FIG. 4 is a sectional view of a long stroke spinning reel according to one embodiment of the present invention.

The spinning reel for fishing according to one embodiment of the present invention comprises, as shown in FIG. 4, a reel body 10, a rotor 68 rotatably mounted on the front of the reel body 10, and a spool 69 for winding or releasing a fishing line at the front of the rotor 68.

The reel body 10 is detachably secured on a fishing rod and includes in its inside a drive gear 2 geared with a handle (not shown) which is protruded outwardly.

A front opening 10a is formed on the reel body 10 and is secured with a bearing 67 by means of a screw 10b. A tubular pinion shaft is rotatably supported in the front opening 10a through the bearing 67.

The tubular pinion shaft is formed on its rear periphery with a pinion 65 which meshes with the drive gear 2 to rotate by the rotation of the handle, and includes a pinion sleeve 64 extended forwardly from the pinion 65 through the front opening 10a. The tubular pinion shaft is rotatably supported on the pinion sleeve 64 via the bearing 67 of the front opening 10a, and the periphery of the front end of the pinion sleeve 64 is formed with a male threaded portion 64'. The threaded portion 64' is threaded with the threaded portion 62' of female screw formed on the inner back side of the tubular traverse cam shaft 62 which will be described hereafter. Also, as will be described hereafter, a main shaft 70 is inserted rotatably and reciprocatably into the through hole of the tubular pinion shaft 64.

Meanwhile, if the tubular pinion shaft is rotatable in only one direction, an one-way bearing 67' is inserted from the back of the bearing 67 into the front opening 10a, and is fitted with the pinion sleeve 64 of the tubular pinion shaft through a pinion collar 66. The rotor 68 is rotatable and is inserted from the front of the front opening 10a into the pinion sleeve 64 through the bearing 67.

The main shaft 70 is inserted rotatably and reciprocatably into the longitudinal through hole of the tubular pinion shaft and is reciprocatably fixed to the reel body 10 by an anti-rotating member 72 at the rear end thereof. The anti-rotating member 72 is secured to the reel body 10 and the main shaft 70 is secured to the axial through hole of the anti-rotating member 72 through a key, such as a D-shaped key, so that the main shaft 70 does not rotate but slidably moves back and forth in the axial through hole of the anti-rotating member 72.

The tubular traverse cam shaft 62 fitted rotatably and reciprocatably from the front of the rotor 68 into the main shaft 70. The rear end of the cam shaft 62 is formed with a female threaded portion 62' inside thereof and is threaded with the threaded portion 64' of the pinion sleeve 64 to integrally secure the tubular pinion shaft and the rotor 68 of this construction, the tubular traverse cam shaft 62, the rotor 68 and the tubular pinion shaft are rotatably secured through the bearing 67 to the reel body 10 by the threaded engagement of respective threaded portions 62' and 64' and is rotatable against the main shaft 70. The main shaft 70 is rotatable along the longitudinal through holes of the tubular traverse cam shaft 62 and the tubular pinion shaft.

Meanwhile, a traverse groove 62b is formed on the periphery of the tubular traverse cam shaft 62 and meshes with the pawl 59. Accordingly, by the relative rotation of the tubular traverse cam shaft 62 and the pawl 59, the pawl 59 moves back and forth along the traverse groove 62b against the tubular traverse cam shaft 62 which is rotatably secured.

The pawl 59 is secured to the main shaft 70 by pawl securing means 54, 56 and 58 which are inserted rotatably against the radial shaft of the traverse cam shaft 62. The pawl securing means 54, 56 and 58 shown in FIGS. 4 to 7 consist of a pawl cap 54, a metal sleeve 56 and a pawl holder 58.

Figure 5:
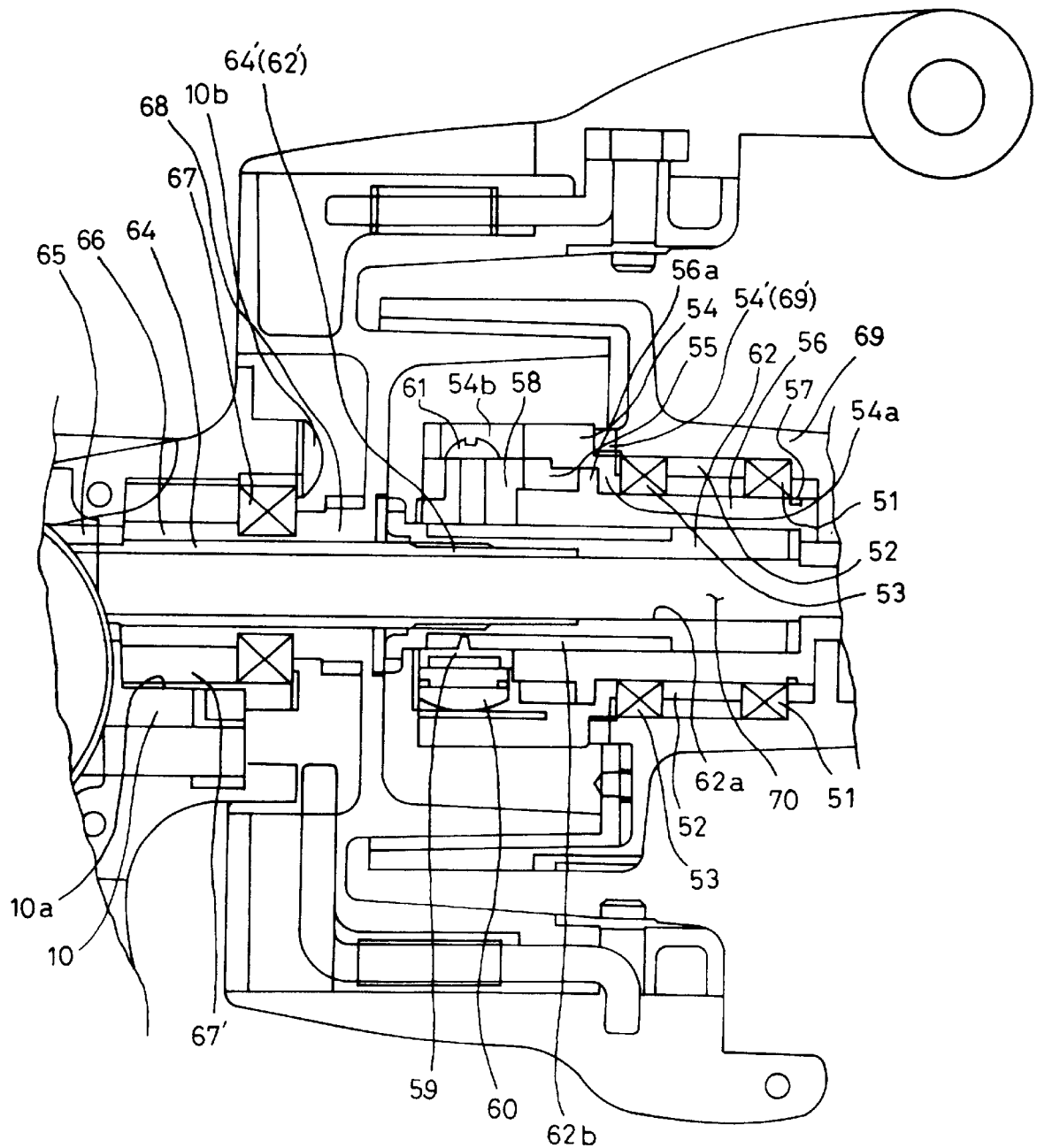
FIG. 5 is a partially enlarged sectional view of the tubular traverse cam shaft portion of FIG. 4.
Figure 6:
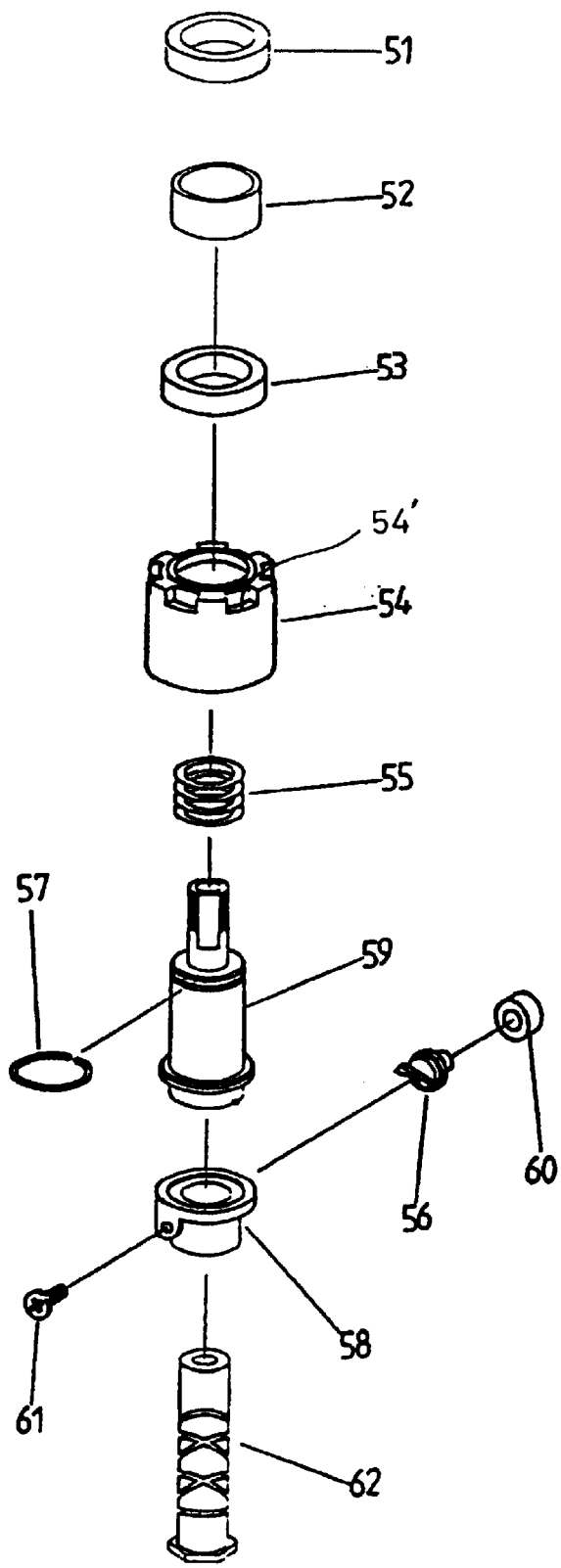
FIG. 6 is a perspective exploded view of the tubular traverse cam shaft portion of FIG. 4.

Referring to FIGS. 4 and 5, the pawl holder 58 supports the pawl 59 in the radial through hole to rotate the pawl around the radial shaft of the tubular traverse cam shaft 62, and is rotatably fitted into the periphery of the tubular traverse cam shaft 62. The pawl cap 54 supports the pawl 59 against its radially outward movement to the tubular traverse cam shaft 62. A pawl locking screw 61 is threaded with the periphery of the pawl holder 58 through a slot type of a through hole 54b of the pawl cap 54 to move the latter forward against the pawl holder 58. Also key grooves 54' are formed on the front end of the pawl cap 54.

The spool 69 includes a key 69' which is detachable from the inner rear end of the spool 69 toward its front and is engaged with the key groove 54' (see FIG. 6) of the pawl cap 54 to rotate with the spool 69. The spool 69 is rotatably fitted into the metal sleeve 56 by the bearings 51 and 53 and the bearing collar 52, and moves back and forth with the metal sleeve 56. The bearings 51 and 53 may be secured to the metal sleeve 56 by a bearing securing ring 57.

Figure 7:
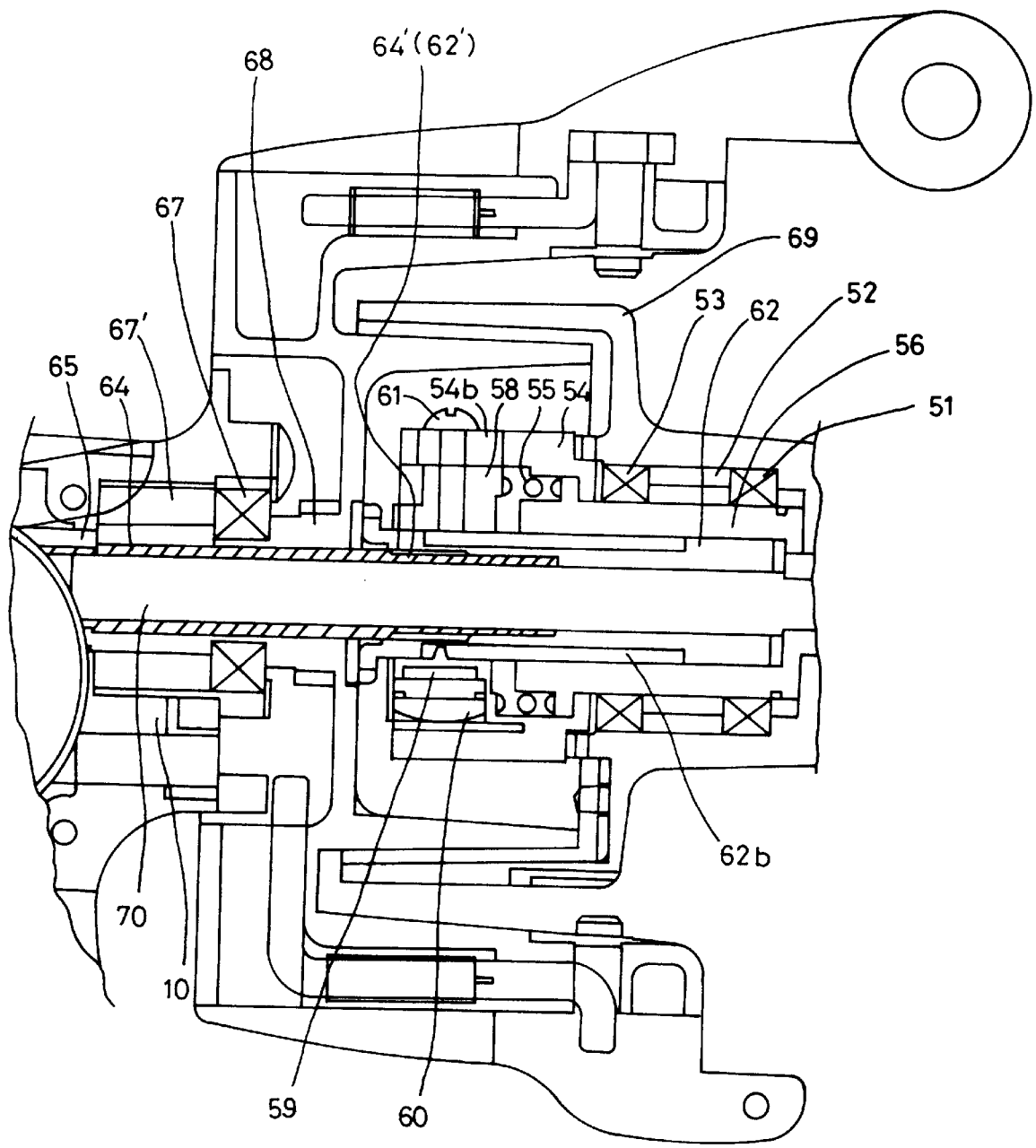
FIG. 7 is a view similar to FIG. 5 and illustrates a damping spring against the impact load applied to a spool.

In the embodiment shown in FIG. 7, the pawl cap 54 is fitted into the periphery of the pawl holder 58 and secured thereto. The key 69' of the spool 69 and the pawl cap 54 are engaged rotatably with each other with a desired gap between them to move the spool 69 backwardly against the forward impact load to the spool 69. As shown in FIGS. 4 to 7, a compressing spring 55 is provided in the desired gap between the metal sleeve 56 and the pawl holder 58.

Figure 8:
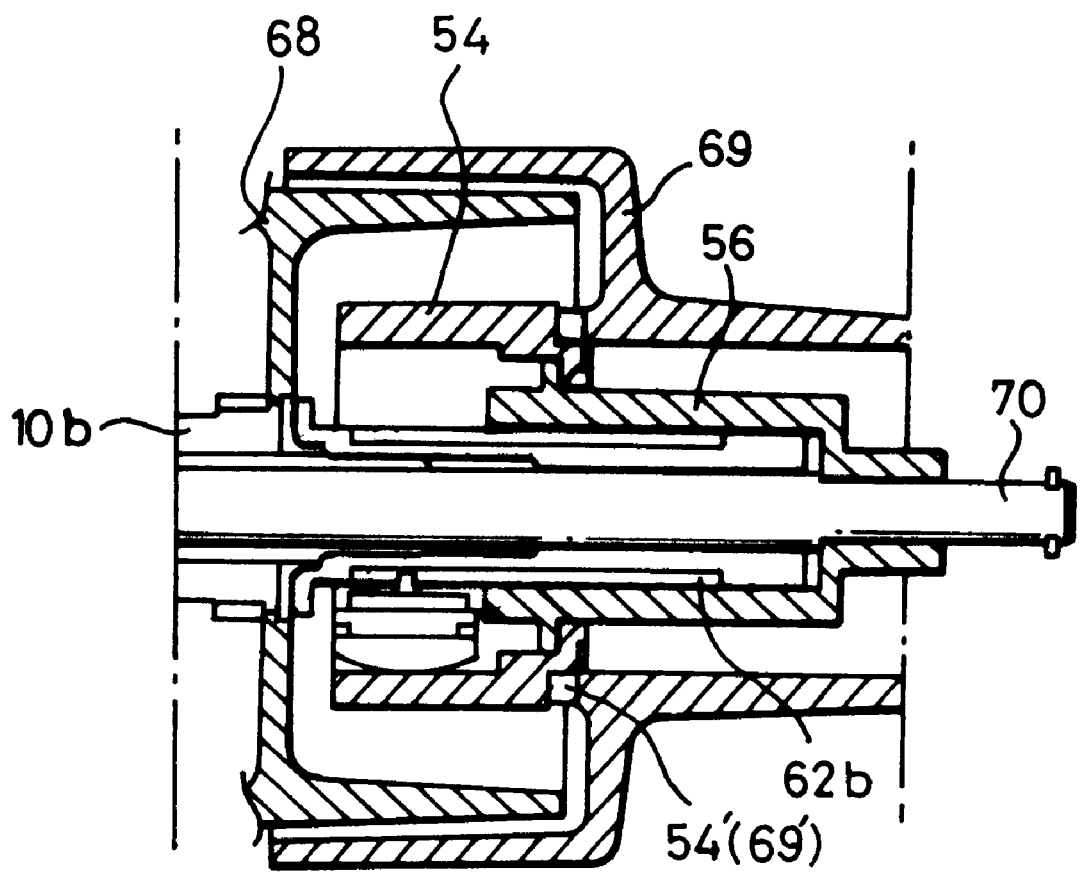
FIG. 8 is a sectional view illustrating the engagement of a spool and a pawl cap.

Referring to FIG. 8, when the fishing line is paid out, the spool rotates and the rotating force rotates the pawl cap 54 via the key 69' of the spool 69 and the key groove 54' engaged with the key 69'. The rotating force of the pawl cap 54 is transferred to the pawl 59, so that the pawl 59 moves straight along the traverse groove 62b. By the straight movement of the pawl 59 the spool 69 can be reciprocated. In case of the prior art, when the spool is positioned on the front side of the spinning reel, because the fishing line is paid out, the spool rotates merely in that position. Accordingly, the fishing line suffers from maximum releasing resistance, resulting in easy entangling of the line. According to the present invention, however, when the fishing line is paid out, because the spool rotates and moves back and forth, the above problem does not happen. It will be understood that the present invention is not limited to the above description and also includes the pawl securing means fixed to the main shaft 70 to cause the spool 69 to rotate only when casting.

Meanwhile, in FIGS. 4 to 7 the metal sleeve 56 has a flange 56a on the periphery of its back. The pawl cap 54 also has a flange 54a on the inside of the front end to move the spool 69 backwardly through the pawl holder 58, the pawl cap 54 and the metal sleeve 56 when the spool 59 moves back.

In FIG. 7, because the flange 56a of the pawl cap 54 is disposed in a desired gap from the bearing 51 of the spool 69, the spool 69 can move back against the front impact load without affecting the pawl cap 54 and the pawl 59.

Operation of the embodiments of the present invention with the above construction will now be described.

In a spinning reel shown in FIGS. 4 and 5, when the fishing line is retrieved, the tubular pinion shaft is rotated against the reel body 10 and the main shaft 70 through the drive gear 2 by rotating the handle in a desired direction, so that the tubular traverse cam shaft 62 and the rotor 68 which are engaged integrally rotate with each other. By the rotation of the tubular traverse cam shaft 62 the pawl 59 moves back and forth along the traverse groove 62b of the cam shaft 62. When the pawl 59 moves forth, the spool 69 moves back and forth via the spring 55 and the metal sleeve 54. At that time, the rotor 68 rotates, and the fishing line is guided by the bail arm 9 and the line guiding roller 9a which are fixed to the rotor 68, so that the fishing line is evenly wound onto the winding portion of the spool 69.

Meanwhile, when the fishing line is paid out, the spool 69 rotates in the opposite direction to the winding direction by the casting force, and the pawl cap 54 rotates through the key 69' of the spool 69 and the key groove 54' of the pawl cap 54. Thereby, the pawl 59 which is secured to the pawl holder 58 by the screw 61 engaged to the through hole 54b of the pawl cap 54 rotates with the pawl holder 58 around the tubular traverse cam shaft 62. The pawl 59 moves back and forth along the path of the traverse groove 62b of the tubular traverse cam shaft 62. Accordingly, when casting, the fishing line is paid out from the winding portion of the spool, with the spool 69 rotating and reciprocating, so that the fishing line is not entangled and the casting resistance or releasing resistance is significantly reduced.

Also, when impact load is applied from the front to the spool, the metal sleeve 56 and the main shaft 70 as well as the spool 69 move backwardly against the biasing force of the spring 56, and the pawl cap 54 moves forwardly through the through hole 54b relative to the pawl holder 58, the pawl 59 and the pawl locking screw 61. Therefore, the impacting load is absorbed by the spring 55 and is not transferred to the pawl 59.

In the embodiment shown in FIG. 7, in which the pawl cap 54 is fixed to the pawl holder 58, when the fishing line is paid out, it operates similarly similar to the embodiment shown in FIGS. 4 and 5. However, when the impact load is applied to the spool 69 from the front, the spool 69 moves backwardly by a desired gap between the key groove 54' of the pawl cap 54 and the key 69', and along with the movement of the spool 69, the metal sleeve 56 also moves backwardly against the spring 55. Therefore, the impact load is absorbed by the spring 55 and does not transfer to the pawl 59.

With the construction and operation of the long stroke spinning reel according to the embodiments of the present invention, by fitting the tubular traverse cam shaft 62 into the periphery of the main shaft 70, the strength of the tubular traverse cam shaft and the pawl is improved to smoothly affect the traverse cam against some degrees of impact load.

Also, the outer diameter of the traverse groove 62b can be enlarged relative to the same speed reducing ratio of the drive gear 2 and the pinion, so that the long length of the fishing line may be wound by the smaller spinning rate of the handle.

Moreover, because the pawl securing means consists of the pawl cap 54, the metal sleeve 56 and the pawl holder 58, during casting, the spool rotates and moves back and forth, so that the fishing line can be paid out without snarling or entangling and without suffering from the casting resistance of the line, and the casting distance can be enhanced.

Also, by the simple construction, for example, by mounting the spring between the pawl holder 58 and the metal sleeve 56, forming the through hole 54b on the pawl cap 54 and engaging the pawl locking screw 61 of the pawl holder 58 to the back of the through hole, the spool 69 can move back and forth, and the impact load against the spool can be eliminated. The mechanism for reciprocating the spool 69 can be constructed very simply by providing the pawl cap 54 and the metal sleeve 56 with the flanges 54a and 56a.

While the present invention has been described and illustrated herein with reference to the preferred embodiments thereof, it will be understood by those skilled in the art that various changes in form and details may be made therein without departing from the spirit and scope of the invention. For example, the present invention is adopted to the front drag type of the spinning reel in the above embodiments, but can be adopted to a rear drag type of a spinning reel. Also, the compressing spring 55 is adopted as damping means in the above embodiments, but it can be replaced with a spring washer or other elements having damping capabilities.

What is claimed is:

1. A spinning reel for fishing, in which a fishing line is wound onto a winding portion of a spool by rotation of a handle and is paid out from the winding portion of the spool by exterior force, the spinning reel comprising:

a reel body having a front opening;

a drive gear rotatably supported inside of the reel body and operable to rotate by rotating of the handle;

a tubular pinion shaft having a pinion on a periphery of the shaft to rotate the shaft by rotation of the handle, and a pinion sleeve which is extended forwardly from the pinion through the front opening, is rotatably supported on the front opening and is formed with a threaded portion on a periphery of the front end;

a rotor fitted onto the pinion sleeve in front of the front opening;

a main shaft disposed in the tubular pinion shaft, a front end of the main shaft being disposed inside the spool and the rear end of the main shaft being reciprocatably secured to the reel body;

a tubular traverse cam shaft having on its periphery a traverse groove, the tubular traverse cam shaft being rotatably and reciprocatably disposed around the main shaft and having a threaded portion which is threaded with the threaded portion of the pinion sleeve to integrally engage the tubular pinion shaft with the rotor;

a pawl meshing with the traverse groove and moving back and forth by rotation of the traverse cam shaft; and pawl securing apparatus for fixing the pawl to the main shaft to prevent the pawl from radially rotating with the traverse cam shaft, the pawl securing apparatus includes a pawl holder supporting and preventing the pawl against the radial movement of the traverse cam shaft and fitted into the periphery of the pinion shaft, a pawl cap having on its front end a plurality of key grooves for supporting the pawl against its radial and outward movement to the tubular cam shaft, and a metal sleeve secured to the pawl cap and secured to the main shaft reciprocatable with the main shaft; and wherein the spool including a plurality of keys engaged with the plurality of key grooves to detach the spool from a rear end of the spool and rotate with the spool, and is fitted into the metal sleeve.

2. The spinning reel as claimed in claim 1, wherein the pinion sleeve and the rotor are rotatably secure to the reel body by a screw portion through a rotor bearing fixed to the front opening of the reel body.

3. The spinning reel as claimed in claim 1, wherein a pawl cap is inserted into a periphery of the pawl holder to rotate with the pawl holder and move backwardly from the pawl holder; the metal sleeve is inserted rotatably and reciprocatably into a periphery of the traverse cam shaft, with a desired gap between the metal sleeve and the pawl holder, and has a flange formed on a periphery of its back side; and a spring is interposed between the pawl holder and metal sleeve; and wherein when impact load is applied to the main shaft the spring absorbs the impact load through the metal sleeve, and when the pawl moves forwardly, the spool moves through the pawl holder, the spring and the metal sleeve.

4. The spinning reel as claimed in claim 3, wherein the pawl cap includes a through hole and a screw fitted into the through hole and secured to the pawl holder to rotate with the pawl holder and to move backwardly from the pawl holder.

5. The spinning reel as claimed in claim 1, wherein the pawl cap is securely inserted to the periphery of the pawl holder; a coupling of the spool and a coupling of the pawl cap is rotatably engaged with each other, with a desired gap between them, to move the spool backwardly, when impact load is applied to the spool from the front; the metal sleeve is disposed rotatably and reciprocatably to the periphery of the traverse cam shaft, with a desired gap between the metal sleeve and pawl holder, and has a flange formed on its inner side of a front end of the pawl cap to contact rotatably with the flange of the metal sleeve, thereby causing the metal sleeve, the main shaft and the spool to move backwardly, when the pawl moves backwardly; and a spring is interposed between the pawl holder and the metal sleeve; and wherein when impact load is applied to the main shaft from a forward, the spring absorbs the impact load through the metal sleeve, and when the pawl moves forwardly, the spool moves through the pawl holder, the spring and the metal sleeve.

6. A spinning reel for fishing, in which a fishing line is wound onto a winding portion of a spool by rotation of a handle is paid out from the winding portion of the spool by exterior force, the spinning reel comprising:

a reel body having an opening end;

a drive gear rotatably supported inside the reel body and operable to rotate by rotation of the handle;

a tubular pinion shaft having a pinion disposed on a periphery of the shaft and coupled to the drive gear to rotate the tubular pinion shaft from rotation of the handle, and a pinion sleeve extending from the pinion through the opening end, and being rotatably supported on the opening end, the pinion sleeve having a threaded portion;

a rotor disposed around the opening end and coupled to the pinion sleeve, the rotor being rotable radially with respect to the tubular pinion shaft;

a main shaft disposed inside the tubular pinion shaft and reciprocatably secured to the reel body, one end of the main shaft being disposed inside the spool;

a tubular traverse cam shaft rotatably and reciprocatably disposed around the main shaft, and having a traverse groove on its periphery, the tubular traverse cam shaft further having a threaded portion threaded with the threaded portion of the pinion sleeve to integrally engage the tubular pinion shaft with the rotor;

a pawl operable to mesh with the traverse groove and move reciprocatably by rotation of the traverse cam shaft; and pawl securing apparatus for fixing the pawl to the main shaft to prevent the pawl from radially rotating with the tubular traverse cam shaft, the pawl securing apparatus includes a pawl holder supporting and preventing the pawl against the radial movement of the traverse cam shaft and fitted into the periphery of the pinion shaft, a pawl cap having on its front end a plurality of key grooves for supporting the pawl against its radial and outward movement to the tubular cam shaft, and a metal sleeve secured to the pawl cap and secured to the main shaft reciprocatable with the main shaft; and wherein the spool including a plurality of keys engaged with the plurality of key grooves to detach the spool from a rear end of the spool and rotate with the spool, and is fitted into the metal sleeve.

* * * * *